(12) United States Patent
Lanni (10) Patent No.: US 7,035,126 B1
(45) Date of Patent: Apr. 25, 2006

(54) PROGRAMMABLE POWER SUPPLY CAPABLE OF RECEIVING AC AND DC POWER INPUT

(75) Inventor: Thomas W. Lanni, Laguna Niguel, CA (US)

(73) Assignee: Comarco Wireless Technologies, Inc., Irvine, CA (US)

( * ) Notice: Subject to any disclaimer, the term of this patent is extended or adjusted under 35 U.S.C. 154(b) by 0 days.

(21) Appl. No.: 10/166,214

(22) Filed: Jun. 10, 2002

(51) Int. Cl.
*H02M 1/10* (2006.01)

(52) U.S. Cl. .................. 363/142; 363/146; 439/131; 439/501; 439/518

(58) Field of Classification Search ................ 363/142, 363/146; 439/131, 170, 171, 174, 501, 518
See application file for complete search history.

(56) References Cited

U.S. PATENT DOCUMENTS

| | | | |
|---|---|---|---|
| 4,679,130 A | 7/1987 | Moscovici | 363/17 |
| 5,159,545 A * | 10/1992 | Lee | 363/146 |
| 5,170,067 A | 12/1992 | Baum et al. | |
| 5,715,156 A | 2/1998 | Yilmaz et al. | 363/142 |
| 5,720,628 A * | 2/1998 | Usui et al. | 439/502 |
| 5,783,927 A | 7/1998 | Chen | |
| 5,838,554 A | 11/1998 | Lanni | |
| 5,847,545 A * | 12/1998 | Chen et al. | 320/138 |
| 5,901,056 A * | 5/1999 | Hung | 363/142 |
| 5,906,509 A * | 5/1999 | Wu | 439/518 |
| 5,940,282 A | 8/1999 | Oglesbee | |
| 5,977,747 A | 11/1999 | Huang | |
| 6,057,610 A | 5/2000 | Nierescher | |
| 6,127,803 A | 10/2000 | Wang et al. | 320/114 |
| 6,172,884 B1 * | 1/2001 | Lanni | 363/21.05 |
| 6,172,891 B1 | 1/2001 | O'Neal et al. | |
| 6,179,633 B1 | 1/2001 | Inada | |
| 6,241,538 B1 * | 6/2001 | Chen | 439/131 |
| 6,266,261 B1 | 7/2001 | Lanni | |
| 6,402,546 B1 * | 6/2002 | Groves et al. | 439/501 |
| 6,406,313 B1 * | 6/2002 | Victor | 439/175 |
| 6,416,355 B1 * | 7/2002 | Liao | 439/501 |
| 6,428,348 B1 * | 8/2002 | Bean | 439/501 |
| 6,433,274 B1 | 8/2002 | Doss et al. | 174/50 |
| 6,502,777 B1 * | 1/2003 | Liao | 242/373 |
| 6,548,755 B1 * | 4/2003 | Wu | 174/50 |
| 6,585,530 B1 * | 7/2003 | Steiert et al. | 439/131 |
| 6,790,062 B1 * | 9/2004 | Liao | 439/171 |

(Continued)

FOREIGN PATENT DOCUMENTS

GB 2291278 A 1/1996

(Continued)

OTHER PUBLICATIONS

PC World Technology Advice You Can Trust, 2-pgs, Web link: http://www.pcworld.com/features/article/0,aid,105851,pg,12,00.asp.

(Continued)

*Primary Examiner*—Gary L Laxton
(74) *Attorney, Agent, or Firm*—Pillsbury Winthrop Shaw Pittman LLP (57) ABSTRACT

A power supply capable of receiving an AC or DC input power signal and converting the received input power signal into a DC output power signal includes retractable AC and DC input plugs as well as a retractable output cable. One or more interchangeable tips may be attached to the end of the output cable to change a characteristic of the output power to meet a power requirement of an electronic device to which power is being supplied. The tips may be stored in a recess in the outer housing of the power supply.

56 Claims, 3 Drawing Sheets

U.S. PATENT DOCUMENTS

2002/0071290 A1    6/2002    Youn et al. .................. 363/15

FOREIGN PATENT DOCUMENTS

| GB | 2 322 486 | 8/1998 |
|---|---|---|
| GB | 2322486 A | 8/1998 |
| GB | 2326540 A | 12/1998 |
| WO | 99/12244 | 3/1999 |
| WO | WO 01/73900 A1 | 4/2001 |
| WO | WO 01/73900 | 10/2001 |

OTHER PUBLICATIONS

ZDNet, ZDNet AnchorDesk, E-mail newsletter, (Reprint of 11/22 article), "Hey Road Warriors: This Gadget will Charge You UP", 2-pgs, Web link: http://www.zdnet.com/anchordesk/stories/story/0,10738,2898375,00.html.

ZDNet, ZDNet Tech Update Today, E-mail newsletter, "Got Juice? It's a must-have for road warriors", 2-pgs, Web link: http://techupdate.zdnet.com/techupdate/stories/main/0,14179,2898233,00.html.

allNetDevices, "Company Unveils Mobile Power and Palm Presentation Products", 2-pgs, Web link: http://www/allnetdevices.com/wireless/news/2002/07/02/company_unveils.html.

PC World.com, Technology Advice You Can Trust, Mobile Gear Gets a Charge on the Run, More power to you: Seidio, IGo unveils kits that recharge notebooks, PDAs, cell phones from various sources, 2-pgs, Web link: http://www.pcworld.com/news/article/0,aid,102345,00.asp.

Mobility Electronics, "Mobility Electronics Unveils "Juice"—First Universal, Combination AC/DC and DC/DC Power Adapter for Notebooks and Mobile Devices", 3-pgs, Web link: http://www/mobilityelectronics.com/releases/2002/2002_26_06_01.asp.

MacCentral, Macworld's News Service, "iGo Juice charges PowerBook, PDA, cell phone", 2-pgs.

"iGo-Buy batteries and accessories for your cellular, notebook and handheld devices", Web link: http://www.igo.com/ProductDetail.asp?catalog%5F...e=iGoCAT&product%5Fid=21541&variant%5Fid=134121 (1 of 2) [Jan. 21, 2003 7:17:45 PM].

Juice—The power of one, iGo mobility products, "Juice$^{70}$ Turning Power into Productivity"; 1-pg, Web link: http://www.igo.com/mapfiles/juice.asp [Nov. 8, 2002 9:50:19 AM].

Mobility Electronics; Welcome, Mobility Electronics, The Mobile Computing Solutions Company, 1-pg, Web link: http://www.mobilityelectronics.com/ [Nov. 8, 2002 9:49:27 AM].

Peripheral Powering System (PPS), iGo mobility products, Q&A, 2-pgs.

Combination AC and auto/air notebook power adapter, Juice$^{70}$™ The Power of One, iGo mobility products, Q&A, 2-pgs.

Juice$^{70}$™ The Power of One, iGo mobility products, 5-pgs.

ZDNet, ZDNet AnchorDesk, "Hey road warriors: This gadget will charge you up", 2-pgs, Web link: http://www.zdnet.com/anchordesk/stories/story/0,10738,2898375,00.html (1 of 2) [Dec. 3, 2002 10:48:28 AM].

"Mobility Electronics Announces the Production and Availability of 'Juice'—The First Combination AC.DC and DC.DC Power Adapter for Notebooks and Mobile Devices," 3-pgs, Web link: http://biz.yahoo.com/prnews/030113/lam020_1.html (1 of 3) [Jan. 13, 2003 9:13:47 AM].

Sony Cellular Phones & Accessories, no date.

New Tech Industries Incorporated, "Universal AC-DC Converter, Online 1999, XP002322903, www.newtechindustries.com/newtech/access/pageA19.htm," New Tech, pp. 1-2, (1999).

ABC Cables, ""Universal Power Supply" Online 2002, XP002322904, www.abccables.com/900-102.html, p. p. 1, (2002).

European Search Report for European Patent Application EP 03 25 3613 dated Apr. 13, 2005.

New Tech Industries Incorp., "Universal AC-DC Converter," New Tech, XP002322903, www.newtechindustries.com/newtec/access/pageA19.htm, pp. 1 and 2.

ABC Cable, "Universal Power Supply," ABC Cables, XP002322904, www.abccables.com/900-102.html, p. 1.

* cited by examiner

PROGRAMMABLE POWER SUPPLY CAPABLE OF RECEIVING AC AND DC POWER INPUT

BACKGROUND

Many electronic devices, such as computers, personal digital assistants (PDAs), mobile telephones, compact disc and cassette players, and the like, are intended to be powered from both alternating current (AC) and direct current (DC) power sources. AC power sources include wall outlets, while DC power sources may include both batteries and vehicle power supplies, such as automobile cigarette lighters and airplane seat power supplies (such as the EMPOWER system). In order to receive power from these various AC and DC power sources, electronic devices must generally be provided with a number of separate power-converting power supplies. Moreover, each electronic appliance may receive operational power at a different required current or voltage. These operational requirements may also change depending on the status of the electronic device (e.g., whether the electronic device's battery is being recharged).

To power electronic devices such as computers, the manufacturer typically provides an external power supply. The external power supply may be a switching power supply that may weigh close to a pound and may be about eight inches long, four inches wide and about four inches high. In addition, the power supply may include a fixed output cable and/or fixed input cables and plugs, making it more difficult to compactly stored.

Such external power supplies therefore contribute substantial additional weight that the user of the computer must carry with him or her to permit battery charging and/or operation from an electrical socket or other power source. Further, the external power supply can be bulky and may not be readily carried in typical cases for portable electronic devices, such as notebook and sub-notebook computers. Also, a separate power supply may be required needed for each peripheral device, such as a printer, external memory (e.g., a disk drive) or the like. Therefore, users need multiple power supplies, which consumes space and increases unnecessary weight. Each of these power supplies may be specifically designed for use with either a particular type of AC or DC power source. Therefore, particularly for portable electronic devices for which it is desirable to be capable of receiving electrical power from any of a number of AC and DC power sources, the user may need to continually carry multiple power supplies adapted for the variety of power sources that may be available.

Some of these deficiencies are addressed in U.S. Pat. Nos. 6,266,261, 5,636,110, 5,838,554, 6,091,611, and 6,172,884 to Lanni, which describe programmable power supplies. The output may be programmed by coupling interchangeable tips to an output cable or terminal of the power supply. A dual-stage power supply for converting AC and DC power input signals into a DC power output signal is also described. These references, however, do not disclose a power supply that can be compactly packaged and easily stored. Nor do they describe how the interchangeable tips may be conveniently and compactly stored to prevent damage and/or loss, which may be particularly problematic where the tips are small in size.

Other references that discuss power supplies capable of receiving both AC and DC power input are similarly deficient. For example, U.S. Pat. No. 6,172,891 to O'Neal et al. describes a power supply that has fixed input cables and plugs for receiving AC and DC power input signals and a fixed output cable and connector for transmitting a DC output cable to an electronic device. Moreover, the O'Neal reference does not describe any means for converting the AC or DC input power signals into DC power output signals of various characteristics matching the input power requirements of more than one electronic device.

The power supply disclosed in U.S. Pat. No. 6,057,610 to Nierescher includes a fixed AC input plug to which a DC plug attachment may be fitted such that the power supply can receive a DC power input power signal. As with the O'Neal et al. reference, the input cable to the AC input plug is described as fixed. While the DC plug attachment and the output cable are shown as being potentially removable, the Neirescher reference does not disclose how these attachments are to be conveniently stored with the power supply.

U.S. Pat. No. 5,940,282 to Oglesbee also describes a power supply that includes a fixed AC input plug to which a removable DC input plug attachment may be coupled. No output cable, whether fixed, removable or retractable is described. Furthermore, as with the Nierescher reference, the Oglesbee reference does not disclose any means for compactly and conveniently storing the input plugs and cables or the output cables.

It is believed to be desirable to provide a power supply with a thin package and designed to fit within a standard pocket on a shirt or a standard calculator pocket on a brief case. In addition, it is believed to be desirable that the power supply be capable of receiving input power from either AC or DC power sources and be capable of providing a programmable output power to meet the requirements of a host of electronic devices.

BRIEF DESCRIPTION OF THE FIGURES

A detailed description of embodiments of the invention will be made with reference to the accompanying drawings, wherein like numerals designate corresponding parts in the several figures.

DETAILED DESCRIPTION

Embodiments of the present invention are directed to a power supply for receiving power from either an AC or a DC power source and providing an output power signal which is suitable for powering any of a host of electronic devices. The disclosures of U.S. Pat. Nos. 6,266,261, 5,636,110, 5,838,554, 6,091,611, and 6,172,884 and the related U.S. patent applications from which these issued patents claim priority are herein incorporated by reference.

Figure 1:
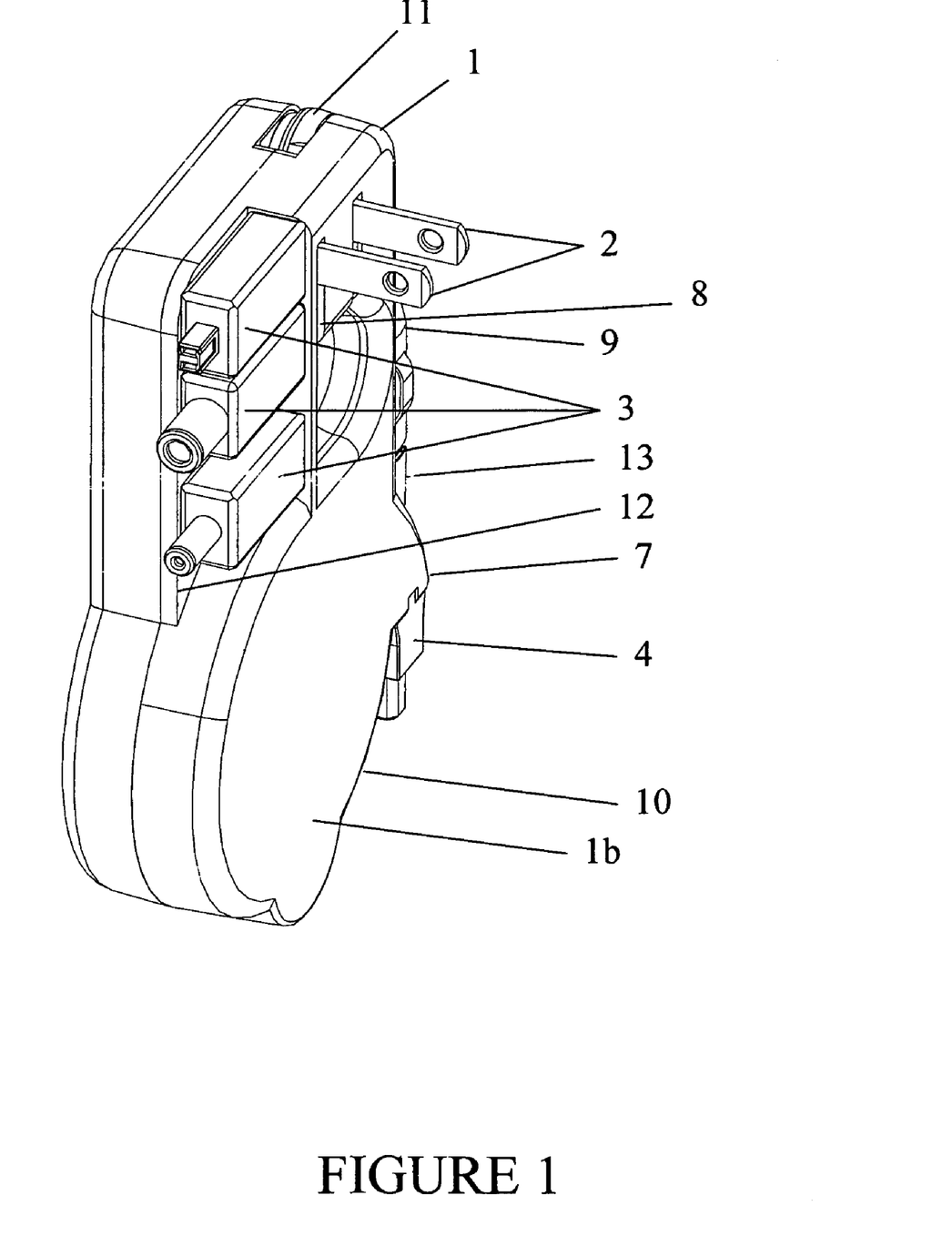
FIG. 1 is a left back perspective view of an embodiment of the present invention.
Figure 2:
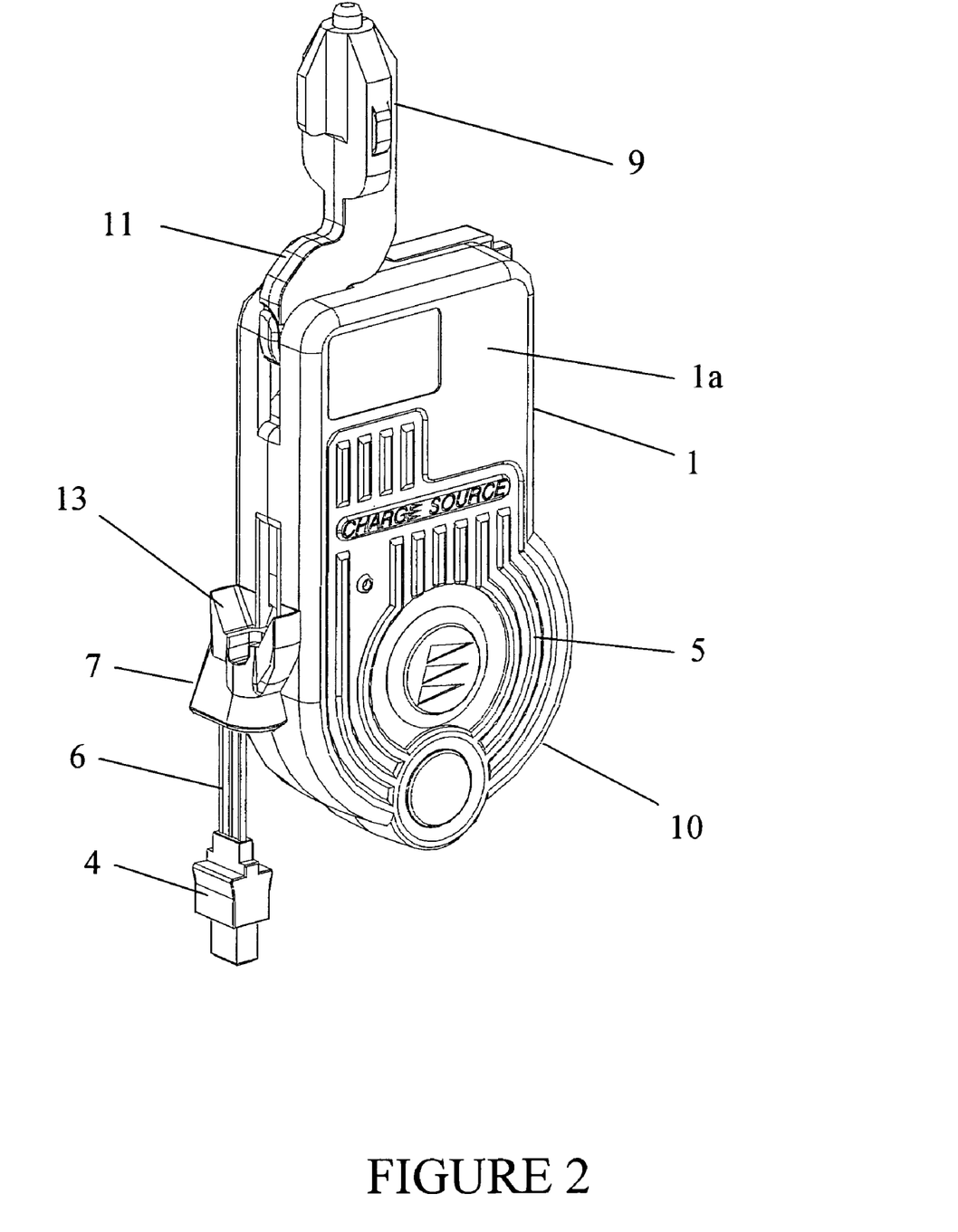
FIG. 2 is a right front perspective view of an embodiment of the present invention.

FIGS. 1 and 2 show a power supply according to an embodiment of the present invention. The power supply may include an outer housing 1 with a front surface 1a and a back surface 1b, that encloses internal power conversion circuitry. The outer housing may be made of high impact suitable plastics, such as Lexan or ABF, or a similar lightweight, non-conductive material, and may include multiple louvers 5 that define multiple openings therebetween to increase the amount of heat dissipated by the outer housing 1. Although in the illustrated embodiment, the louvers 5 are only included on the front surface 1a, in alternative embodiments of the invention, both the front surface 1a and the back surface 1b of the outer housing 1 may include such louvers 5. For heat transfer purposes, however, it is generally useful to include louvers 5 only on surfaces that are exposed to significant air circulation. For example, in the illustrated embodiment, louvers 5 may not be included on the back surface 1b since the back surface 1b may be located near a wall when the prongs 2 of the AC input plug are coupled to a wall outlet.

Although the term "openings" is used to describe the areas of the outer housing 1 between louvers 5, it should be understood that the internal components of the power supply may not be directly exposed (i.e., "open to") to air at those openings. In fact, the openings may instead be areas at which the material of the outer housing is simply thinner than the areas of the outer housing 1 at which the louvers 5 are present. However, the thickness of the outer housing 1 material at the openings may still be chosen to be thick enough to prevent the entry of liquids or other elements that may damage internal components of the power supply. In preferred embodiments, the thickness of the outer housing 1 at the openings may be chosen to be between 1 and 3 mils.

The configuration of the openings in the outer housing 1 may be designed to improve the appearance of the power supply. In embodiments of the present invention, however, the openings may be designed to provide sufficient air circulation and heat transfer surface area so that, even when operating at maximum rated output power, the surface temperature of the outer housing 1 is less than a desired maximum temperature selected based on the potential for injury to a user and/or damage to internal components of the power supply. For example, the outer housing 1 may be designed not to exceed a maximum temperature of one hundred and forty degrees Fahrenheit (140° F.) and preferably less than one hundred and twenty degrees Fahrenheit (120° F.) when the unit is operated at the maximum rated power of, for example seventy five watts DC. In embodiments of the invention, the portion of the outer housing 1 at the openings may be made of a different material (e.g., metals, composites, ceramics or other heat conductive and liquid resistant materials) than the portion of the outer housing 1 at the louvers 5.

In embodiments of the invention, the outer housing 1 may include a rounded portion 10 that encloses a chamber containing a portion of the output cable 6 when the output cable 6 is in a retracted state. In embodiments of the invention, the outer housing may include an outlet 7 with an opening 16 through which the output cord 6 may exit the outer housing 1. Although the output cable 6 may generally be of any type typically used for power output, in embodiments in which the output cable 6 is retractable, the output cable 6 is preferably of a type that is easily stored within the outer housing 1, such as a flat cable. However, in alternative embodiments, the body of the cable may be rounded. The output cable 6 may end in an output terminal 4. When the output cable 6 is retracted, the output terminal 4 may rest against the outlet 7. In embodiments of the invention (as discussed in greater detail below with respect to FIG. 3), the mechanism for retracting the output cable 6 may be biased toward the retracted state. In such embodiments, resting the output terminal 4 against the outlet 7 may easily permit the user to pull on the output terminal 4 to overcome such bias to extend the output cable 6.

In embodiments of the invention, the output terminal 4 may be coupled to interchangeable tips 3 to vary the output power characteristics (e.g., voltage and/or current) of the power supply. In particular embodiments of the invention, the output terminal may have a first pin coupled to an output voltage, a second pin coupled to ground, a third pin for returning a current control signal to the power conversion circuitry within the outer housing 1 and a fourth pin for returning a voltage control signal to the power conversion circuitry. In particular embodiments of the invention, the output terminal may have four conductive pins, such as those described in U.S. Pat. Nos. 5,838,554, 6,091,611, and 6,172,884. However, alternatively configured output terminals may also be used.

One end of each tip 3 may be of a common shape and size adapted to mate with the free end of the output terminal 4, while the other end of each tip may be of a unique shape, size and/or pin configuration adapted to mate with the power input terminal of one or more electronic is devices. For example, a first tip 3 may have an end configured to mate with the power input terminal of Toshiba laptop computers, while a second tip may have an end configured to mate with the power input terminal of Compaq laptop computers, and a third tip 3 may have an end configured to mate with the power input terminal of Nokia cellular telephones. As disclosed in U.S. Pat. Nos. 5,838,554, 6,091,611, and 6,172,884, the tips 3 may be contain a resistive programming element and the associated power conversion circuit may output power of a particular voltage, current or other characteristic based on the resistive value of the programming resistor. Alternatively, the output power characteristics may be changed by the receipt of an appropriate control signal from the electronic device itself. In embodiments of the former type, in addition to each having an end configured to mate with the power input terminal of one or more electronic devices, each tip may include one or more programming elements (e.g., resistors) that are configured to cause the power supply to output power satisfying an input power requirement of the electronic devices with which the tip is configured to mate.

Tips 3 that are not currently being used may be kept within a tip recess 12 in the outer housing. In embodiments of the invention, a wall of the tip recess 12 to which the tips 3 may be removably affixed may include a docking site of the same size and shape as the end of the output terminal 4 with which the tip 3 would mate when in use. In such an embodiment the tips 3 would each be mated with a docking site when not in use. In embodiments of the invention, the tip recess 12 may have one docking site, and the outer body of each of the tips 3 themselves may have additional docking sites, such that one stored tip 3 may be mated to the wall of the tip recess 12 and the remaining stored tip 3 may be successively stacked thereon. Alternatively, the tips 3 may be held in the tip recess 12 by means of a fastener, such as a cord or clip. In applications in which the power supply is to be transported frequently, it may be desirable to secure the tips 3 within the tip recess 12 in a way that prevents movement of the tips 3 so as to avoid loss or damage to the tips 3.

The power supply may also include an AC input plug with prongs 2. The prongs 2 of the AC input plug may be electrically coupled to input terminals of an AC-DC power conversion circuit. Although a two-prong AC input plug is shown, other types of AC input plugs with different numbers of prongs (e.g., a three-prong plug with a prong connected to ground) and/or different prong configurations (e.g., such as may be suitable for use with the outlets provided in different countries) may alternatively be used.

According to an embodiment of the invention, the prongs 2 may be retractable. In embodiments of the invention similar to that illustrated in FIGS. 1 and 2, the prongs 2 may protrude substantially perpendicularly from the surface of the outer housing when the AC input plug is coupled to a wall outlet or other AC power source, and pivot into recesses 8 in the outer housing when the AC input plug is not being used. Although in the illustrated embodiment, the prongs 2 are shown as pivoting into the recesses 8, in alternative embodiments, the prongs 2 may be retracted into the outer housing 1 in other ways. For example, the prongs 2 may be retracted by sliding them into deeper recesses in the outer housing 1 in the direction of the length of the prongs 2. Moreover, in embodiments in which the prongs 2 are retracted by pivoting, the direction of rotation may be different than that shown. For example, in embodiments of the invention, the prongs may be pivoted towards each other and may overlap each other in the retracted position.

In alternative embodiments of the invention, the entire AC input plug, including a plug body, may move when the AC input plug is changed to the retracted state. The AC input plug may be extended by engaging and rotating a tab to rotate the AC input plug out of the recess in the outer housing 1. In alternative embodiments, the AC input plug may be spring-loaded such that a catch locks the AC input plug in the retracted position and the spring rotates the AC input plug into the extended position once the catch is released. The AC input plug may include detentes or use other methods to maintain the prongs 2 in the extended or retracted position.

Once extended, the AC input plug can be inserted into a wall socket or other AC power source. In the embodiment illustrated, the outer housing may hang down against a wall for stability and support. In alternative embodiments, the AC input plug may be recessed and fixed in the outer housing 1 of the power supply to receive an electrical cord that is removably attached between the AC input plug and an AC power source.

Furthermore, for safety reasons, in embodiments of the invention, the prongs 2 may be electrically disconnected from the power conversion circuit when in the retracted position. When in the extended position, however, the prongs may be electrically coupled to an AC-DC power conversion circuit, such as those described in U.S. Pat. Nos. 6,266,261 and 6,172,884, which may be mounted on a printed circuitboard (14 in FIG. 3) within the outer housing.

The power supply may also include a DC input plug 9. The DC input plug 9 may have an end adapted for mating with an automobile cigarette lighter (as shown in FIG. 2), an airplane seat power supply, a battery pack, or the like. As with the AC input plug (prongs 2), the DC input plug 9 may be retractable. In the illustrated embodiment, the DC input plug 9 may be pivoted between an extended position (shown in FIG. 2) and a retracted position in which the DC input plug 9 may rest with one side against the outer housing. The DC input plug 9 may include a pivot arm 11 that is rotatably affixed to the outer housing 1. In the retracted position, the end of the DC input plug 9 opposite the pivot point may rest within a protective cap 13. As shown in FIG. 2, the protective cap 3 is formed as part of the outlet 7. The DC input plug 9 may be coupled to a DC-DC power conversion circuit, such as those described in U.S. Pat. Nos. 6,266,261 and 6,172,884, when in the extended state. However, the DC input plug 9 may be decoupled from the circuit when in the retracted state (e.g., resting within the protective cap 3).

In embodiments of the invention, the power conversion circuit may consist of two portions, namely a primary stage capable of converting an AC input current to a DC current and a secondary stage capable of converting a DC current to an AC current. Thus, when the two portions are combined such that the output of the secondary stage is transmitted to the primary stage as an input, the combination may be considered a DC-DC power conversion circuit and the primary stage alone may be considered an AC-DC power conversion circuit. In alternative embodiments, the primary stage may be a DC-DC power conversion circuit and the secondary stage may be an AC-DC power conversion circuit designed to output DC power that can be input to the primary stage. Two-stage power conversion circuits that may be used in embodiments of the present invention are described in U.S. Pat. No. 6,266,261, particularly with respect to FIGS. 3A–3B, 7A–7B, 51, and 55–56 thereof.

To reduce the amount of space occupied by the power conversion circuit, the primary stage and the secondary stage may be mounted on the same circuit board in embodiments of the invention. Alternatively, the primary stage and the secondary stage may be contained in separable compartments of the outer housing 1, such that the DC input plug 9 and a DC-AC primary stage of the power conversion circuit may be removably coupled to the remainder of the power supply.

Figure 3:
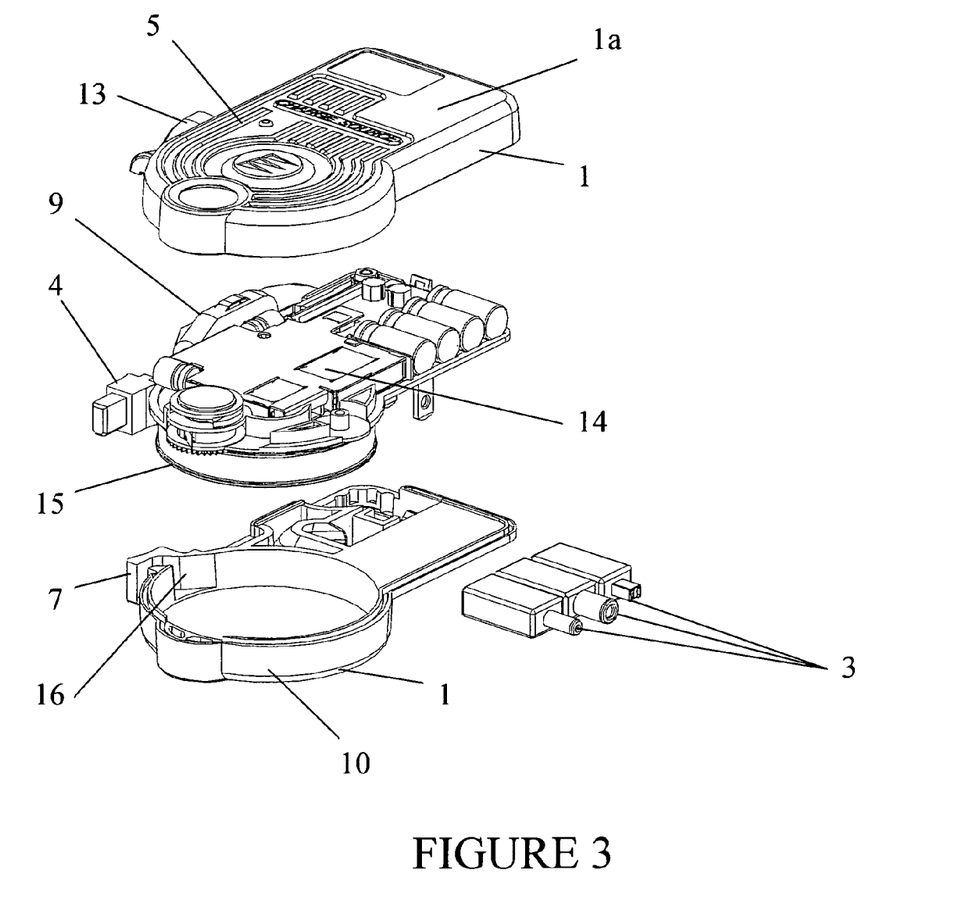
FIG. 3 is a exploded top right perspective view of an embodiment of the present invention.

FIG. 3 depicts an exploded view of the power supply according to an embodiment of the present invention. The rounded portion 10 of the outer housing 1 may include a take-up spool 15 around which the retracted portion of the output cable 6 may be wrapped. In embodiments of the invention, the take-up spool may be mounted on an axle that is biased (e.g., using a torsion spring) to pull the output cable 6 into the outer housing 1. In such embodiments, the outlet 7 may include a locking mechanism that a user may activate to apply a force to an unretracted portion of the output cable 6 to prevent the unretracted portion of the output cable 6 from being drawn into the outer housing 1. Alternatively, the take-up spool 15 may include teeth or other projections that interfere with a movable stop internal to the rounded portion 10 of the outer housing 1, such that as the user pulls on the output cable, the stop permits only unidirectional rotation of the take-up spool 15. The user may move the stop away from the take-up spool 15 in order to retract the output cable 6. In embodiments in which the take-up spool 15 is not biased, a handle may be mounted on the surface of the outer housing to allow the user to manually rotate the take-up spool 15.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A power supply for providing electrical power to an electronic device, said power supply comprising:
   a DC power input plug adapted to receive a DC input power signal from a DC power source, said DC power input plug coupled to a hinge, said hinge rotatably fixed to an outer housing, capable of being pivoted between an extended position and a retracted position, wherein in the retracted position, a first side of the DC power input plug rests against a first side of the outer housing of the power supply and an end of the DC power input plug rests within a protective cap attached to the outer housing, the protective cap being formed to fittingly engage the end of the DC power input plug;

an AC power input plug adapted to receive an AC input power signal from an AC power source;

a power output terminal adapted to couple to a power input terminal of an electronic device to transmit a DC output power signal to said electronic device, wherein the power output terminal is coupled to an output cable, the power output terminal rests against an outlet in a retracted state, and the power output terminal and cable rest against the first side of the outer housing along with the DC power input plug; and a power conversion circuit capable of receiving either of said DC input power signal and said AC input power signal and producing said DC output power signal.

2. The power supply according to claim 1, wherein an electrical characteristic of said DC output power signal meets an input power requirement of said electronic device.

3. The power supply according to claim 2, wherein said electrical characteristic of said DC output power signal is determined by a programming signal received at said output terminal.

4. The power supply according to claim 1, wherein said AC input plug is changeably configurable between an extended state and a retracted state.

5. The power supply according to claim 4, wherein said AC input plug includes at least one prong.

6. The power supply according to claim 5, wherein a portion of said at least one prong extends from said outer housing when said AC input plug is in said extended state.

7. The power supply according to claim 4, wherein said at least one prong is electrically decoupled from said power conversion circuit when said AC input plug is in said retracted state.

8. The power supply according to claim 4, wherein said at least one prong is electrically coupled to said power conversion circuit when said AC input plug is in said extended state.

9. The power supply according to claim 1, wherein said output cable is electrically coupled to said power conversion circuit.

10. The power supply according to claim 1, wherein said output cable is changeably configurable between an extended state and a retracted state.

11. The power supply according to claim 10, wherein a retracted portion of said output cable is contained within said outer housing when said output cable is in said retracted state.

12. The power supply according to claim 11, wherein said output cable is flat.

13. The power supply according to claim 11, wherein said output cable exits said outer housing through an outlet.

14. The power supply according to claim 11, further including a retraction mechanism for placing said retracted portion of said output cable within said outer housing.

15. The power supply according to claim 14, wherein said outer housing includes a rounded portion, and further wherein said retraction mechanism is a take-up spool, and further wherein said retracted portion of said output cable is wound around said take-up spool when said output cable is in said retracted state.

16. The power supply according to claim 14, wherein said retraction mechanism is biased toward retracting said output cable.

17. The power supply of claim 1, wherein the protective cap is formed as part of the outlet.

18. The power supply of claim 1, wherein the hinge is located in a recess formed between a front surface and a back surface of the outer housing.

19. A power supply for supplying output power to one of a plurality of electronic devices, each of said electronic devices having a required input power characteristic, said power supply comprising:

an input plug;

an output terminal for transmitting said output power to said one of the plurality of electronic devices, an outer housing having a recessed surface portion configured to hold a plurality of detached tips, each of said plurality of detached tips configured to be coupled between said output terminal and at least one of said plurality of electronic devices, wherein the recessed surface portion includes a single docking site, said docking site mating with one of the plurality of detached tips and others of the plurality of detached tips being successively stacked thereon; and a power conversion circuit for converting power received by said input plug into an output power, wherein a characteristic of said output power is changed depending on which of a plurality of tips is coupled to said output terminal such that said characteristic of said output power matches said required input power characteristic of one of said plurality of electronic devices.

20. The power supply according to claim 19, wherein said recessed portion of said outer housing includes a docking site having a size and a shape similar to the size and shape of said output terminal.

21. The power supply according to claim 19, wherein each of said plurality of tips has an identical first end configured to be coupled to said output terminal.

22. The power supply according to claim 19, wherein each of said plurality of tips has a second end configured to be coupled to at least one of said plurality of electronic devices at an input terminal thereof, each of the second ends of said plurality of tips different from each other.

23. The power supply according to claim 22, wherein each of said plurality of tips includes an electrical component having an electrical characteristic, such that the coupling of one of said plurality of tips to said output terminal causes said electrical component of said one of said plurality of tips to be electrically coupled to said power conversion circuit.

24. The power supply according to claim 23, further wherein said electrical characteristics of each of said electrical components differ from each other.

25. The power supply according to claim 22, further including an output cable having a first end affixed to said output terminal and a second end electrically coupled to said power conversion circuit.

26. The power supply according to claim 25, further including a retraction mechanism that shortens the portion of said output cable protruding from said opening when activated.

27. The power supply according to claim 25, wherein a portion of said output cable protrudes from an opening in said outer housing and the remainder of said output cable is contained within said outer housing.

28. The power supply according to claim 27, wherein said retraction mechanism is biased toward activation.

29. The power supply according to claim 27, wherein said output terminal is prevented from moving through said opening.

30. The power supply of claim 19, wherein the recessed surface portion of a back surface holding the plurality of detached tips is at a different level than a remaining surface portion of the back surface.

31. A method of providing power to an electronic device, said electronic device having an input power requirement, said method comprising:

connecting a first input plug of a power supply to a power source to receive power from said power source, wherein said power supply includes said first input plug and a second input plug, one of said first input plug and said second input plug configured to be coupled to an AC power source and the other of said first input plug and said second input plug configured to be coupled to a DC power source, wherein said second input plug is capable of being pivoted between an extended position and a retracted position, wherein in the retracted position, a first side of the second input plug rests against a first side of an outer housing of the power supply and an end of the DC power input plug rests within a protective cap, the protective cap being formed to fittingly engage the end of the DC power input plug;

a power conversion circuit for converting power received by said input plug into an output power;

transmitting power received from said power source to a power conversion circuit;

by said power conversion circuit, converting said power received from said power source to an output power characterized by said input power requirement of said electronic device;

coupling an output cable of said power supply to said electronic device, wherein an power output terminal is coupled to the output cable, the power output terminal rests against an outlet in a retracted state, and the power output terminal and the output cable rest against the first side of the outer housing along with the DC power input plug; and transmitting said output power to said electronic device through said output cable.

32. The method according to claim 31, further including retracting the second input plug.

33. The method according to claim 31, wherein said second input plug does not protrude beyond an outer housing of said power supply.

34. The method according to claim 31, wherein retracting said second input plug further including electrically decoupling said second input plug from said power conversion circuit.

35. The method according to claim 31, further including, extending a prong of said first input plug.

36. The method according to claim 35, wherein said extended prong is substantially perpendicular to a surface of the outer housing of said power supply.

37. The method according to claim 31, wherein coupling said output cable to said electronic device includes attaching a tip to an end of said output cable and an input terminal of said electronic device.

38. The method according to claim 37, wherein said tip has a first end configured to mate with said output cable and a second end configured to mate with said input terminal of said electronic device.

39. The method according to claim 38, further including removing said tip from a recess in the outer housing of said power supply.

40. The method according to claim 38, wherein said tip contains an electrical component corresponding to said input power requirement of said electronic device.

41. The method according to claim 40, wherein said electrical component is a resistor, and further wherein coupling said resistor to said power conversion circuit changes a characteristic of said output power to match said input power requirement.

42. The method according to claim 37, wherein said tip attached to said output cable is one of a plurality of tips.

43. The method according to claim 31, further including extending said output cable from a retracted position.

44. The method according to claim 43, wherein extending said output cable includes expelling a portion of said output cable from within the outer housing of said power supply.

45. The method according to claim 43, wherein extending said output cable includes spinning a take-up spool around which a retracted portion of said output cable is wrapped.

46. The method according to claim 45, further including extending said output cable.

47. A method for powering an electronic device, said method comprising:

decoupling a first input plug on a power supply from a first power source;

coupling a second input plug to a second power source such that power is transmitted from said second power source to a power conversion circuit;

selecting a tip from among a plurality of detached tips held in a recessed surface portion of an outer housing of the power supply, said selected tip configured to be coupled to said electronic device, wherein the recessed surface portion may include a single docking site, said docking site mating with one of the plurality of detached tips and others of the plurality of detached tips being successively stacked thereon;

converting power, at a power conversion circuit, received by said input plug into an output power;

coupling an output cable to said electronic device using said selected tip, said output cable electrically coupled to said power conversion circuit, wherein said first power source is a one of a DC power source and an AC power source and said second power source is one of a DC power source and an AC power source.

48. The method according to claim 47, further including retracting said first input plug.

49. The method according to claim 48, wherein retracting said first input plug includes electrically decoupling said first input plug from said power conversion circuit.

50. The method according to claim 48, wherein retracting said first input plug includes placing a prong of said first input plug within a recess in the outer housing encasing said power conversion circuit.

51. The method according to claim 50, wherein said second plug extends substantially perpendicularly from a surface of said power supply.

52. The method according to claim 50, wherein extending said second plug includes electrically coupling said second plug to said power conversion circuit.

53. The method according to claim 52, wherein extending said output cable includes moving a retracted portion of said output cable from within the outer housing encasing said power conversion circuit.

54. The method according to claim 47, further including extending said second input plug.

55. A power supply for supplying output power to one of a plurality of electronic devices, each of said electronic devices having a required input power characteristic, said power supply comprising:
- an input plug;
- an output terminal for transmitting said output power to said one of the plurality of electronic devices,
- an outer housing that holds a plurality of detached tips, each of said plurality of detached tips configured to be coupled between said output terminal and at least one of said plurality of electronic devices, wherein the outer housing includes a single docking site, said docking site mates with one of the plurality of detached tips and others of the plurality of detached tips are successively stacked thereon; and
- a power conversion circuit for converting power received by said input plug into an output power, wherein a characteristic of said output power is changed depending on which of the plurality of detached tips becomes attached to the power supply because it is coupled to said output terminal, said characteristic of said output power mating said required input power characteristic of said one of said plurality of electronic devices.

56. The power supply of claim 55 wherein the plurality of detached tips are held to the outer surface by a fastener.

* * * * *